(12) United States Patent
Narmack

(10) Patent No.: US 11,292,466 B2
(45) Date of Patent: Apr. 5, 2022

(54) METHOD AND SYSTEM FOR VEHICLE CURVE SPEED RESTRICTION

(71) Applicant: Volvo Car Corporation, Gothenburg (SE)

(72) Inventor: Kirill Narmack, Solna (SE)

(73) Assignee: Volvo Car Corporation, Gothenburg (SE)

( * ) Notice: Subject to any disclaimer, the term of this patent is extended or adjusted under 35 U.S.C. 154(b) by 274 days.

(21) Appl. No.: 16/360,080

(22) Filed: Mar. 21, 2019

(65) Prior Publication Data

US 2019/0322276 A1 Oct. 24, 2019

(30) Foreign Application Priority Data

Apr. 19, 2018 (EP) .................................... 18168144

(51) Int. Cl.
- *B60W 30/14* (2006.01)
- *B60W 30/18* (2012.01)
- *G01C 21/30* (2006.01)

(52) U.S. Cl.
CPC .... *B60W 30/143* (2013.01); *B60W 30/18145* (2013.01); *G01C 21/30* (2013.01); *B60W 2552/30* (2020.02)

(58) Field of Classification Search
CPC ...... G01C 21/30; G01C 21/00; G01C 21/005; G01C 21/26; G01C 21/12; G01C 21/28; G01C 21/34; B60W 30/143; B60W 30/18145; B60W 552/30; B60W 2552/30; B60W 2550/00; B60W 2550/14; B60W 2550/146; B60W 2550/40; B60W 2050/0077; B60W 2050/0078; B60W 2050/0081; B60W 2050/0089; B60W 2050/0097; B60W 50/00; B60W 50/0001; B60W 50/0002; B60W 50/0014;
(Continued)

(56) References Cited

U.S. PATENT DOCUMENTS

| 7,400,963 B2 | 7/2008 | Lee et al. |
| 7,774,121 B2 | 8/2010 | Lee et al. |

(Continued)

FOREIGN PATENT DOCUMENTS

| EP | 2537727 A1 | 12/2012 | |
| EP | 3219564 A1 * | 9/2017 | ............ B60W 10/20 |

OTHER PUBLICATIONS

Dec. 21, 2018 European Search Report issue on International Application No. EP18168144.

*Primary Examiner* — Anthony R Jimenez
(74) *Attorney, Agent, or Firm* — Clements Bernard Walker; Christopher L. Bernard

(57) ABSTRACT

A method for restricting the speed of a vehicle traveling in a curve. Receiving multiple road data samples including location points. Determining a parameter value for each of a first set of vehicle speed affecting parameters. Selecting a vehicle speed model based on the first set of parameter values. Determining a parameter value for each of a second set of vehicle speed affecting parameters. Calculating a recommended speed for the vehicle for at least one of the road samples based on the selected model and the parameter values of the second set of vehicle speed affecting parameters. Providing an instruction for adapting the vehicle speed to the recommended speed at the location point of the at least one road sample.

11 Claims, 5 Drawing Sheets

(58) Field of Classification Search
CPC .. B60W 50/0028; B60W 30/00; B60W 30/08;
B60W 30/14; B60W 30/18; G08G
1/0968; G08G 1/096822; G08G 1/096888
USPC .......................................................... 701/70
See application file for complete search history.

(56) References Cited

U.S. PATENT DOCUMENTS

| | | | | |
|---|---|---|---|---|
| 7,821,421 | B2* | 10/2010 | Tamir | G06Q 40/08 |
| | | | | 340/901 |
| 8,280,560 | B2* | 10/2012 | Huang | B60W 40/09 |
| | | | | 701/1 |
| 2014/0244125 | A1 | 8/2014 | Dorum et al. | |
| 2016/0031450 | A1 | 2/2016 | Wilson | |

* cited by examiner

METHOD AND SYSTEM FOR VEHICLE CURVE SPEED RESTRICTION

CROSS-REFERENCE TO RELATED APPLICATION

The present patent application/patent claims the benefit of priority of co-pending European Patent Application No. 18168144.6, filed on Apr. 19, 2018, and entitled "METHOD AND SYSTEM FOR VEHICLE CURVE SPEED RESTRICTION," the contents of which are incorporated in full by reference for all purposes.

TECHNICAL FIELD

The present invention relates to a method and a system for restricting the speed of a vehicle when traveling in a curve.

BACKGROUND

Todays vehicles are becoming increasingly advanced with regards to safety, both in terms of the structure of the vehicle and control functions for the vehicle. Most modern vehicles are equipped with advanced driver assist systems which aim to assist the driver in a driving process. One example of an advanced driver assist system is cruise control configured to maintain the speed of the vehicle. More advanced cruise control systems are able to dynamically adapt the speed of the vehicle, for example slowing down for lead vehicles.

There are driving situations that may require further input in order to appropriately adapting the vehicle speed. One important such driving situation is when the vehicle is travelling through curves. When travelling through a curve, factors such as road curvature and acceleration may have to be considered in order to calculate a suitable vehicle speed.

U.S. Pat. No. 7,774,121 discloses one example of calculating a target speed profile for a vehicle as it approaches a curve. The system proposed by U.S. Pat. No. 7,774,121 is based on calculating a road curvature profile including curvature data points based on GPS data and vehicle sensor data (e.g. speed, yaw rate, steering angle). The calculated target speed profile is compared to a target speed look-up table calculated off-line in order to select a target speed profile.

However, the accuracy of a determined suitable vehicle curve speed profile may be improved in several ways. For instance, the vehicle speed may be determined in a more adaptive manner depending on the present driving condition. This is particularly important with respect to the maximum allowed vehicle curve speed. Exceeding a maximum allowed vehicle curve speed may otherwise lead to hazardous vehicle accidents.

Accordingly, there is room for further improvement in controlling the vehicle speed through curves.

SUMMARY

In view of above, it is an object of the present invention to provide an improved method and system for restricting the vehicle speed in curves.

According to a first aspect of the invention, there is provided a method for restricting the speed of a vehicle traveling in a curve, the method including: receiving multiple road data samples including location points of a curve path ahead of the vehicle, determining a parameter value for each of a first set of vehicle speed affecting parameters associated with the road data samples; selecting a vehicle speed model from a plurality of predetermined vehicle speed models based on the first set of parameter values; determining a parameter value for each of a second set of vehicle speed affecting parameters, at least one of the parameter values of the second set of vehicle speed affecting parameters is associated with at least one of the road data samples ahead of the vehicle, the second set of parameters including at least one parameter that is not included in the first set of parameters, calculating a recommended speed for the vehicle for at least one of the road samples based on the selected model and the parameter values of the second set of vehicle speed affecting parameters, providing an instruction for adapting the vehicle speed to the recommended speed at the location point of the at least one road sample.

The present invention is based on the realization that the vehicle speed when travelling through a curve may be calculated using a vehicle speed model which may be different depending on a first set of parameter values. In other words, a vehicle speed model which best suits a condition reflected in the first set of parameter values is used for calculating the vehicle speed. Thereby the vehicle speed may be calculated in a more accurate way.

The road samples include information about location points ahead of the vehicle and may be obtained from map data available to the vehicle. The recommended vehicle speed is calculated for at least one of the road samples.

The vehicle speed affecting parameters include parameters that may influence the vehicle speed and that can be measured directly or indirectly. For example, a vehicle speed affecting parameter may be distance between the vehicle and a road sample, road curvature, road width, lane width, road inclination, road type, legal speed limit, road friction, weather conditions, road curvature derivative, road inclination derivative, etc.

The determining of parameter values of the first vehicle speed affecting parameters and of the second set of vehicle speed affecting parameters includes to either retrieve a parameter value that has been predetermined, or to determine the parameter value according to some relation. For example, a road type, weather condition, road width, lane width, and legal speed limit are examples of parameters which values may be retrieved. Further, curvature derivative, inclination derivative, driving style, road friction are examples of parameters that may be determined from a relation, model, or calculation.

Parameter values of first set of vehicle speed affecting parameters are used for selecting a suitable vehicle speed model, and a second set of vehicle speed affecting parameter values are used for calculating the recommended speed either alone or in combination with the first set of vehicle speed affecting parameters.

Selecting a vehicle speed model may include to classify the first set or parameter values into one of several classes each associated with a corresponding vehicle speed model. The classification may be based on predetermined conditions for each of the classes.

In some embodiments the vehicle speed models may be constructed based on machine learning algorithms trained with historical driving data for a plurality of driving conditions wherein the vehicle speed models include a neural network.

For example, regression analysis may be performed on the second set of parameters to find a relationship between the vehicle speed and other parameters/factors, not accounted for in the first set of parameters. This can be done by e.g. a neural network or a mathematical model, uniquely trained/tuned for the first set of parameters.

The vehicle speed models may be constructed off-line. In other words, vehicle speed models in the form of neural networks may be trained using the collected historical driving data. Similarly, vehicle speed models in the form of mathematical models may be tunes using the collected historical driving data. Subsequently, when the system is operative, it may select a suitable vehicle speed model based on the values of the first set of vehicle speed affecting parameters. In addition, the vehicle speed model may be further trained on-line during use of the inventive system.

According to embodiments, the recommended speed may be adjusted according to a criterion before providing the instruction. Thus, in order to ensure that the vehicle speed through the curve is sufficiently restricted, further criteria may be taken into account. The criterion may relate to e.g. a threshold speed, a threshold lateral or longitudinal acceleration. More than one criterion may the taken into account. In addition, the thresholds may be related to the selected vehicle speed model.

According to some embodiments a driver style may be determined based on historical driving data for a driver under known driving conditions, wherein the vehicle speed model is selected based on at least the driver style. Thus, in order to for improve the calculation of the recommended vehicle speed it is advantageously to account for a driver's driver style. A driver style describes the driver's driving behavior during the underlying parameter values of the first set of vehicle speed affecting parameters. The historical driving data may be the driving data during the most recent driving session or sessions.

In some embodiments the driver style may be based on a relation between a legal speed limit at the road sample and an historical average speed for the driver on roads with the same legal speed limit. The historical driving data in this case is the historical average speed.

In some embodiments the driver style may be based on the driver's tolerance for lateral acceleration.

In some embodiments the driver style may be based on the driver's tolerance for longitudinal acceleration.

The driver's tolerance for lateral acceleration or longitudinal acceleration may be determined based on a measured historical high value of recorded lateral acceleration or longitudinal acceleration, respectively, during known parameter values of the first set of vehicle speed affecting parameters. The historical driving data in this case is the recorded lateral acceleration or longitudinal accelerations, respectively.

Generally, a scenario including some specific parameter values and/or parameter value ranges of the first set of vehicle speed affecting parameters may be defined as a driving condition or a driving scenario. Thus, a vehicle speed model may be selected based on a determined driving condition or driving scenario.

In some embodiments the first set of vehicle speed affecting parameters and the second set of vehicle speed affecting parameters may be distinct from each other. In other words, the first and second set may be non-overlapping.

According to embodiments, the vehicle speed models may include a legal speed limit parameter, a curvature parameter indicative of the curvature of the path ahead of the vehicle, for at least one of the road samples.

According to embodiments, the vehicle speed models may include a road inclination parameter indicative of the road inclination for at least one of the road samples.

According to a second aspect of the invention, there is provided a speed adaption system for restricting the speed of a vehicle traveling in a curve, the system includes: a control unit module configured to: receive multiple road data samples including location points of a curve path ahead of the vehicle, determine a parameter value for each of a first set of vehicle speed affecting parameters and determine a parameter value for a second set of vehicle speed affecting parameters, at least a sub-set of each set of parameters parameter values are associated with at least one of the road data samples, a vehicle speed calculation module configured to: select a vehicle speed model from a plurality of predetermined vehicle speed models based on the first set of parameter values, calculate a recommended speed for the vehicle at one of the road samples based on the selected model and the parameter values of the second set of vehicle speed affecting parameters, and provide an instruction signal indicative of the recommended speed at the one road sample, and a vehicle control unit configured to control the speed of the vehicle according to the instruction signal.

The control unit module and the vehicle speed calculating module may be separate processors, or be implemented as applications operating on a single processor.

According to embodiments, the vehicle speed calculation module may be operative based on machine learning algorithms trained with historical driving data for a plurality of driving conditions. As mentioned a driving condition may be a scenario including some specific parameter values and/or parameter value ranges of the first set of vehicle speed affecting parameters.

According to embodiments, the vehicle speed model may be selected further based on a driver style determined based on historical driving data for a driver under known driving conditions.

This second aspect of the invention provides similar advantages as discussed above in relation to the previous aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

Figure 1:
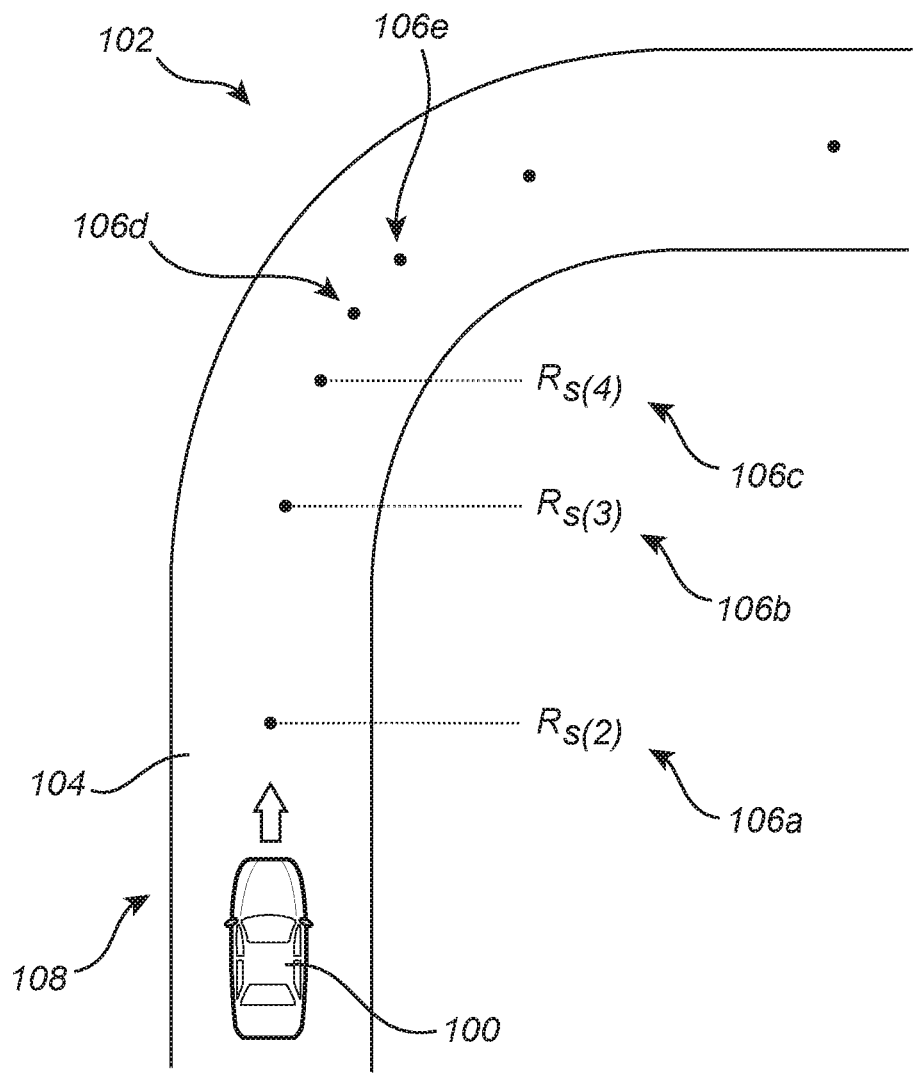
FIG. 1 conceptually illustrates application of embodiments of the invention.

In the present detailed description, various embodiments of the system and method according to the present invention are mainly described with reference to a vehicle in the form of a car. However, the present invention is equally well applicable to other vehicles such as trucks, busses, motorbikes, etc. Thus, this invention may generally be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 conceptually illustrates a vehicle in the form of a car 100 approaching a curved segment 102 of a road 104. A system (not shown) of the car 100 receives multiple road data samples 106*a-c*, here exemplified by the road data samples 106*a-c*, although more than three road data samples may be received. Each road data sample 106*a-c* includes location points of a curve path ahead of the vehicle. The system further retrieves a parameter value for each of a first set of vehicle speed affecting parameters associated with the road data samples. The first set of vehicle speed affecting parameters may for instance include a road curvature at the location, road inclination, road type, weather condition, legal speed limit, and a distance (d) from the road data sample that the vehicle most recently passed and the respective road data sample ahead of the car 100. At least some of the parameter values of the first set of parameters may be included in the road data sample. The location point may be a coordinate for the road data sample. The road data samples 106*b-c* are positioned closer to each other in the curve segment 102 compared to the road data samples 106*a-b* in the relatively straight road segment 108. In this way a higher resolution in determining the recommended vehicle speed is advantageously provided in the parts of the curve with larger curvature (i.e. smaller radius of curvature). The spacing between the road data samples may be equal throughout the curve.

The distance (d) may be used for calculating the distance D between location points for road data samples. The distance D may be used for calculating the curvature and a derivative for the road inclination.

The system selects a vehicle speed model based on the first set of vehicle speed affecting parameter values. Moreover, based on parameter values for a second set of vehicle speed affecting parameters and the selected vehicle speed model, the system calculates a recommended speed for the car 100 at the location point for at least one 106*a* of the road samples.

Accordingly, as the car 100 is approaching the curve 102 the system may receive road data samples 106*a-c* and determine values of a first set of parameters. By analyzing the parameter values of the first set of parameters the system can select a suitable vehicle speed model. Subsequently, using the vehicle speed model together with the parameter values of a second set of parameter values a recommended speed for the vehicle at the location point for at least the next road sample 106*a* can be provided (or at several road data samples). Preferably, a recommended speed is determined for a predetermined number of road samples (106*a-e*) ahead of the vehicle for the upcoming curve. The predetermined number of road samples may depend on the availability of samples ahead of the vehicle. When the car 100 passes the road sample 106*a* the system moves on to determining a recommended speed for a next set of available road samples.

Figure 2:
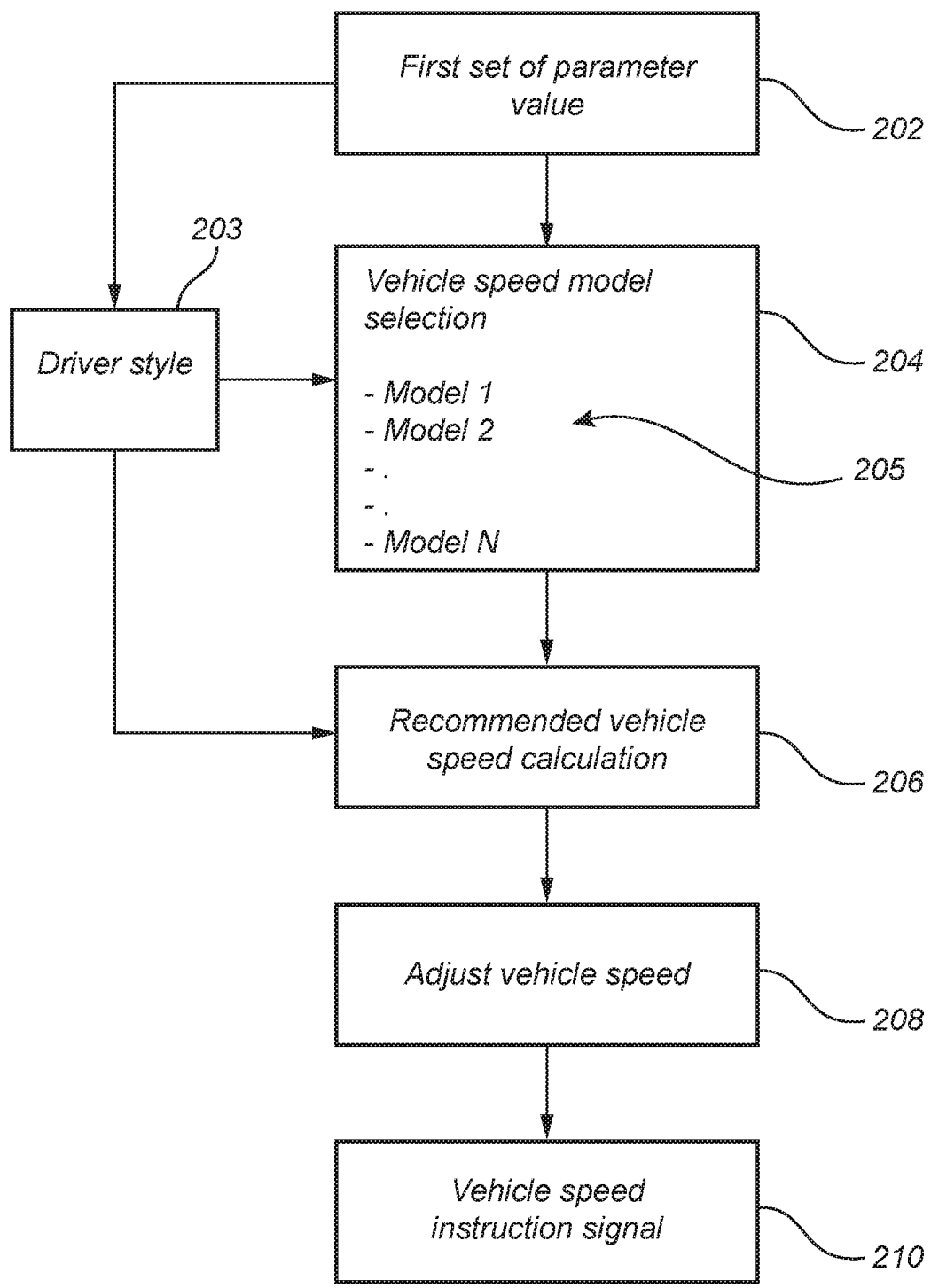
FIG. 2 is a conceptual functional overview for various embodiments of the invention.

FIG. 2 conceptually illustrates an overview of the inventive concept. The values of a first set of parameter values 202 are used for vehicle speed model selection 204. The first set of parameter values 202 may be classified to belong to a class of parameters. The first set of parameters may in some possible implementations include at least some of road type (e.g. gravel or asphalt), weather conditions (temperature, humidity, sunny, overcast, cloudy, rain, snow, hail, etc.), road curvature, driver style, road inclination, legal speed limit, lane width, road width, friction between vehicle tires and road, etc.

The classification may be performed according to predetermined classification rules for a given set of parameters. Based on the classification of the first set of parameters is a vehicle speed model 205 selected. Thus, a vehicle speed model is selected based on the available data in the first set of parameters. The parameters of the vehicle speed model may be unique for the values of the first set of parameters, i.e. for each class.

With the selected vehicle speed model and parameter values for a second set of parameters is a recommended speed calculation performed 206. The calculation of the recommended speed is performed using a relation between the second set of parameters and the recommended speed determined by the selected vehicle speed model.

As will be described further, the regression analysis may be performed to train a neural network or tune a mathematical model in order to construct vehicle speed models. Thus, a relation between vehicle speed and the second set of parameters is obtained which is unique for the values of the first set of parameters.

The second set of parameters may include road type (e.g. gravel or asphalt), weather conditions (temperature, humidity, sunny, overcast, cloudy, rain, snow, hail, etc.), road curvature, driver style, road inclination, legal speed limit, lane width, road width, friction between vehicle tires and road, a driver style, road curvature derivative, road inclination derivative, etc.

In some embodiments a vehicle speed model is selected based at least partly on a driver style 203. The selection of vehicle speed model may be based on a combination of the first set of parameters and the driver style.

A driver's driving style may be modelled by at least one of the driver's tolerance for lateral acceleration, $a_{lat}^{(tol)}$, the driver's tolerance for longitudinal acceleration, $a_{long}^{(tol)}$, or a quotient Q between the driver's average driven speed and the underlying legal speed limit. The quotient Q may be given by:

$$Q = \frac{1}{n} \sum_{i=1}^{n} \frac{v_i}{L_i},$$

where n is the number of speed samples used for the calculation of Q, $v_i$ and $L_i$ are the vehicle speed and legal speed limit at the sample i. Another representation of a driver style is a quotient $Q_p$ for each individual legal speed limit $L_p$:

$$Q_p = \frac{1}{n_p} \frac{1}{L_p} \sum_{i=1}^{n_p} v_i.$$

Thus, a driver style quotient $Q_p$ may be calculated for each category of legal speed limit. This may provide a more accurate way of defining the driver style compared to the above quotient between the driver's average driven speed and the underlying legal speed limit.

The driver's tolerance for lateral acceleration provides a limitation on the vehicle's speed when driving through a curve. This is based on the realization that the lateral acceleration of the vehicle is the centripetal force acting on the vehicle. The higher the speed the larger the lateral acceleration gets. In order to determine a driver's tolerance for lateral acceleration, $a_{lat}^{(tol)}$ acceleration data from acceleration data from the most recent driving session may be collected for different driving conditions such as different road properties and types and weather conditions. The peak lateral accelerations in the collected lateral acceleration data are used for the driver's tolerance for lateral acceleration, $a_{lat}^{(tol)}$. The peak lateral accelerations are selected after having removed outliers in the data. The outlier's may for example be the 1% peak values in the raw data.

The driver's tolerance for longitudinal acceleration, $a_{long}^{(tol)}$ provides a limitation on variations in the vehicles speed when driving through a curve and is determined in an analogous way as described for the driver's tolerance for lateral acceleration, $a_{lat}^{(tol)}$.

Longitudinal and lateral acceleration data may be determined with accelerometers arranged on the vehicle.

The first set of parameters and/or the second set of parameters may include lateral and/or longitudinal acceleration data. Thus, using the values of the first set of parameters 202 a driver style may be selected and subsequently used in the selection of vehicle speed model 204.

In addition, the driver style may be used as input for calculating a recommended vehicle speed 206 in some embodiments.

Now with further reference to FIG. 2, the recommended vehicle speed may optionally be adjusted 208 according to some criterion.

A first adjustment may be to restrict the recommended speed $v^{(m)}$ at road sample m to be below a maximum allowed speed, $v_{max}$, i.e.:

$$v^{(m)} < v_{max}$$

The maximum allowed speed may be based on the first set of parameter values. In other words, based on the combination of the first set of parameter values is a maximum speed retrieved. This may for example be based on the above described classification of the first set of parameters, i.e. the first set of parameters are classified for selecting a vehicle speed model, and at the same time is a maximum speed retrieved.

A second adjustment may be to restrict the recommended vehicle speed in such a way that a threshold for lateral acceleration, $a_{lat}^{(thresh)}$, is not exceeded. Analogous to the above maximum speed limit, the threshold lateral acceleration may be retrieved based on the combination of the first set of parameter values. The threshold lateral acceleration may be unique for each of the vehicle speed models. The threshold lateral acceleration $a_{lat}^{(thresh)}$ may be equal to the driver's tolerance value for lateral acceleration for a selected vehicle speed model, or to a comfortable lateral acceleration threshold. The recommended speed $v^{(m)}$ may be restricted with respect to the lateral acceleration threshold according to:

$$v^{(m)} < \sqrt{r^{(m)} |a_{lat}^{(thresh)}|},$$

where $r^{(m)}$ is the curve radius of road data sample m.

A third adjustment of the recommended speed may be to restrict the recommended vehicle speed in such a way that a threshold for longitudinal acceleration, $a_{lat}^{(thresh)}$, is not exceeded. Analogous to the above maximum speed limit and threshold lateral acceleration, the threshold longitudinal acceleration may be retrieved based on the combination of the first set of parameter values. The threshold longitudinal acceleration may be unique for each of the vehicle speed models. The threshold longitudinal acceleration $a_{long}^{(thresh)}$ may be equal to the driver's tolerance value for longitudinal acceleration for a selected vehicle speed model, or to a comfortable longitudinal acceleration threshold. The recommended speed $v^{(m)}$ may be restricted with respect to the longitudinal acceleration threshold according to:

$$v^{(m)} < v^{(m-1)} \pm \Delta t |a_{long}^{(thresh)}|,$$

where $\Delta t$ is the time it takes the vehicle to travel from road data sample m−1 to road data sample m. In one possible implementation is the adjustment of the recommended vehicle speed performed starting with the first adjustment, next the second adjustment and finally the third adjustment.

Finally an instruction signal 210 is provided with the recommended vehicle speed, possibly adjusted 208 according to the above. The instruction signal may be provided to a vehicle control unit for restricting the speed of the vehicle at the road sample under consideration.

The vehicle speed models may be based on a mathematical model or on neural network modelling. In one possible example implementation which will now be described is a mathematical underlying model used. One possible mathematical model for the recommended vehicle speed $v^{(m)}$ is given by:

$$v^{(m)} = \eta_p Q_p L^{(m)} + \alpha_p |c^m|$$

where $Q_p$ is the above described quotient, $\eta_p$ is a scaling parameter, $L^{(m)}$ is the legal speed limit at the road data sample m, $\alpha_p$ represents a relationship between the road curvature and the vehicle speed, and $c^{(m)}$ is the road curvature at road data sample m. The scaling parameter $\eta_p$ and the parameter $\alpha_p$ are unique for each specific set of first vehicle speed affecting parameters, and for each legal speed limit within each specific set of first vehicle speed affecting parameters. The above mathematical model may be an underlying mathematical model used for generating a set of vehicle speed models which may be used for calculating a recommended vehicle speed at a road data sample.

Depending on the present combination of parameter values in the first set of parameters a vehicle speed model is selected for which a relation between the recommended vehicle speed $v^{(m)}$ and vehicle speed affecting parameters not included in the first set of parameters have previously been determined during training or tuning of the vehicle speed models. For example, for a specific first set of parameter values regression analysis (using e.g. a least square estimation method) may be performed between the above mathematical model and historical parameter values of the second set of parameters to find a relationship between the vehicle speed and the second set of parameters not accounted for in the first set of parameter values. In this way, the scaling parameter $\eta_p$ and the parameter $\alpha_p$ may be uniquely pre-determined for unique combinations of parameter values in the first set of parameters.

In other words, depending on the present combination of parameter values in the first set of parameters a vehicle speed model is selected for which $\eta_p$ and $\alpha_p$ have previously been determined using the same parameters as the present combination of parameter values of the first set of parameters.

In one possible implementation of the inventive concept may another (second) mathematical model be used for generating the vehicle speed models, the second mathematical model is given by:

$$\begin{cases} v_{21}^{(m)} = \eta_p Q_p L^{(m)} + \alpha_p |c^m| + \beta_p^+ \partial^- l_+^m \\ v_{22}^{(m)} = \eta_p Q_p L^{(m)} + \alpha_p |c^m| + \beta_p^- \partial^- l_-^m \end{cases}$$

where $\beta_p^+$ and $\beta_p^-$ represent a relationship between the backward derivative $(\partial^- I_+^m, \partial^- I_-^m)$ of the road inclination and the vehicle speed. $\beta_p^+$ is used for calculating the vehicle recommended speed $(v_{21}^{(m)})$ for road data samples with a positive backward derivative $\partial^- I_+^m$, and $\beta_p^-$ is used for calculating the vehicle recommended speed $(v_{22}^{(m)})$ when for road data samples with a negative or zero backward derivative $\partial^- I_-^m$.

Depending on the present combination of parameter values in the first set of parameters a vehicle speed model is selected for which a relation between the recommended vehicle speed $(v_{21}^{(m)})$ or $(v_{22}^{(m)})$ and vehicle speed affecting parameters not included in the first set of parameters have been determined. As described above, for a specific first set of parameter values regression analysis (using e.g. a least square estimation method) may be performed between the above mathematical model and historical parameter values of the second set of parameters to find a relationship between the vehicle speed and the second set of parameters not accounted for in the first set of parameter values. In this way, the scaling parameter $\eta_p$, the parameter $\alpha_p$, $\beta_p^+$, and $\beta_p^-$ may be uniquely pre-determined for unique combinations of parameter values in the first set of parameters.

In other words, depending on the present combination of parameter values in the first set of parameters a vehicle speed model (a specific $v_{21}^{(m)}$ or $v_{22}^{(m)}$) is selected for which $\eta_p$, $\alpha_p$, $\beta_p^+$, and $\beta_p^-$ have been previously determined using the same parameters as the present combination of parameter values and/or parameter value or ranges of the first set of parameters.

Figure 3:
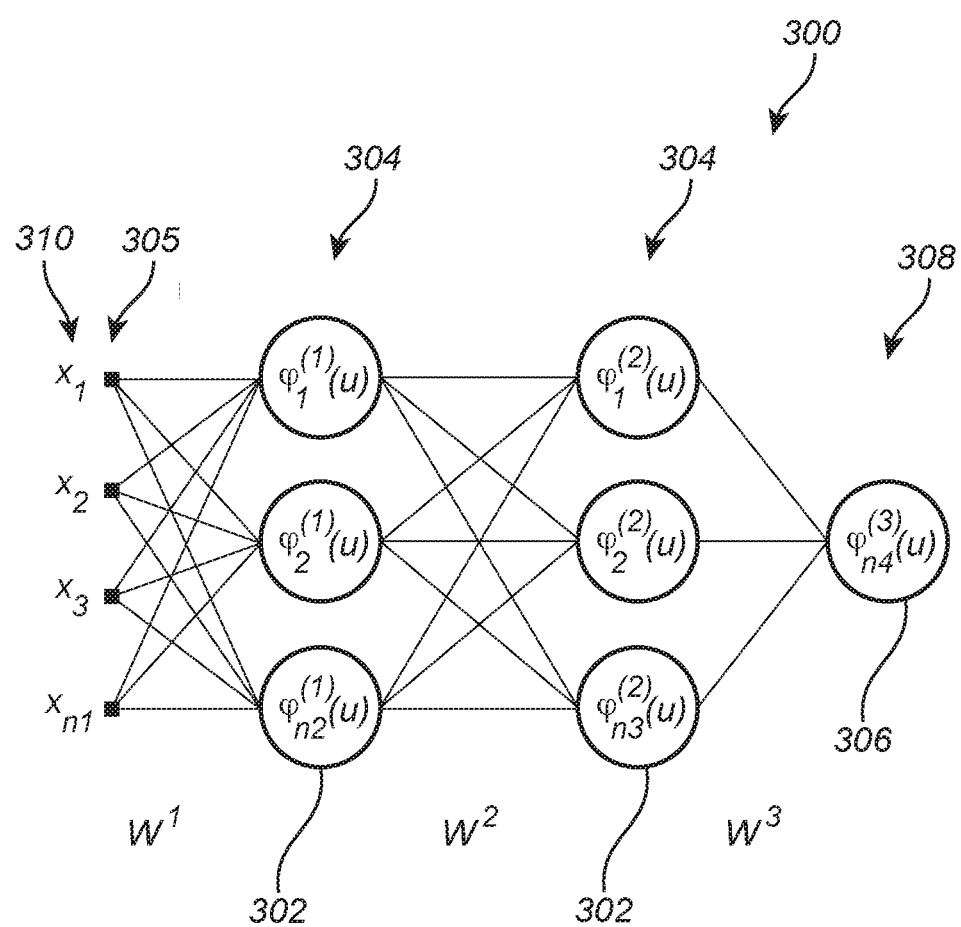
FIG. 3 conceptually shows a deep neural network.

Moreover, in some possible implementations of the inventive concept, the vehicle speed models may be based on machine learning algorithms trained with historical driving data for a plurality of driving conditions. For example, a deep neural network may be used and is exemplified in FIG. 3. The deep neural network 300 includes a set of nodes 302 (not all are numbered) in each of a plurality of hidden layers 304 (here only two hidden layers are shown for exemplary purposes), an input layer 305, and an output layer 308 with a single node 306 (the recommended vehicle speed). Depending on the first set of parameters is a neural network chosen. The neural network then takes the second set 310 of parameters as input and has been trained on that specific second set of parameters, and models the vehicle speed to output the recommended vehicle speed in the output layer 308. The layers 305, 304 are connected by weights $W^1$, $W^2$, and $W^3$, and each node 302 includes an activation function $\varphi(u)$. The deep neural network may for example be a multilayer perceptron or a radial basis function network. Training of the deep neural network 300 may be performed by a backpropagation algorithm known per se to the skilled person as well as neural networks.

Figure 4:
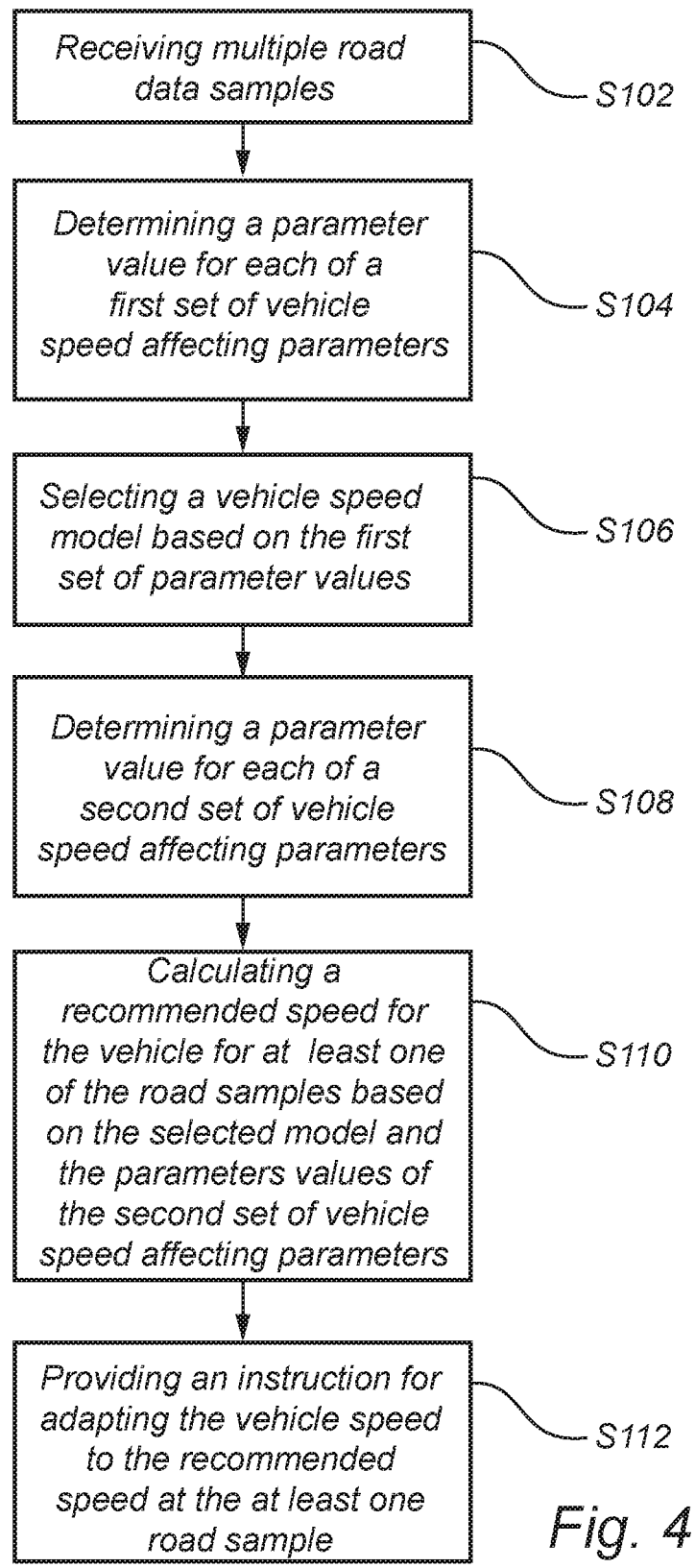
FIG. 4 is a flow chart of method steps according to embodiments of the invention.

FIG. 4 is a flow-chat of method steps according to embodiments of the invention. In step S102 multiple road data samples are received including location points of a curve path ahead of the vehicle. In step S104 a parameter value is determined for each of a first set of vehicle speed affecting parameters, at least one of the parameter values are associated with at least one of the road data samples. Subsequently in step S106 a vehicle speed model is selected from a plurality of predetermined vehicle speed models based on the first set of parameter values. A parameter value for each of a second set of vehicle speed affecting parameters are determined in step S108, the at least one of the parameter values of the second set of vehicle speed affecting parameters is associated with at least one of the road data samples ahead of the vehicle. The second set of parameters including at least one parameter that is not included in the first set of parameters. In step S110 is a recommended speed calculated for the vehicle at one of the road samples based on the selected model and the parameter values of the second set of vehicle speed affecting parameters. Subsequently in step S112 is an instruction provided for adapting the vehicle speed to the recommended speed at the one road sample.

The method according to the inventive concept may be performed on a server (i.e. a central control unit) in communication with the vehicle. In such case the recommended speed may be provided to the vehicle via wireless communication whereby the vehicle includes a communication unit for receiving wireless signals from the server. The server may then be in communication with a plurality of vehicles to provide recommended curve speeds.

Figure 5:
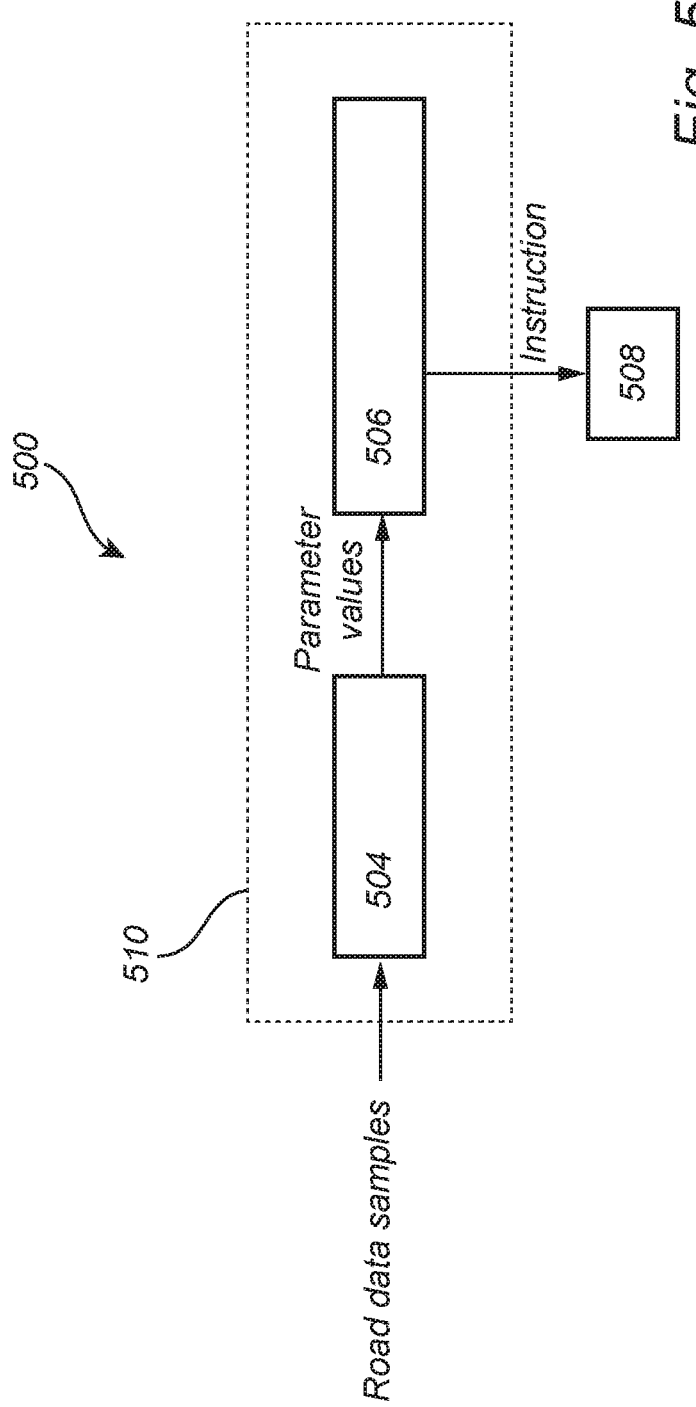
FIG. 5 schematically illustrates a system according to embodiments of the invention.

FIG. 5 conceptually illustrates a speed adaption system 500 for restricting the speed of a vehicle traveling in a curve. The system includes a control unit module 504 configured to receive multiple road data samples including location points of a curve path ahead of the vehicle. In addition, the control unit module 504 is configured to determine a parameter value for each of a first set of vehicle speed affecting parameters. Moreover, the control unit module 504 is configured to determine a parameter value for each of a second set of vehicle speed affecting parameters. At least a sub-set of each set of parameter values are associated with at least one of the road data samples.

The system 500 further includes a vehicle speed calculation module 506 configured to receive the parameter values from the control unit module 504. The vehicle speed calculation module 506 selects a vehicle speed model from a plurality of predetermined vehicle speed models based on the first set of parameter values. In addition, the vehicle speed calculation module 506 calculates a recommended speed for the vehicle at one of the road samples based on the selected model and the parameter values of the second set of vehicle speed affecting parameters. The vehicle speed calculation module 506 subsequently provides an instruction signal indicative of the recommended speed at the one road sample to a vehicle control unit 508 which is configured to control the speed of the vehicle according to the instruction signal.

The control unit module 504 and the vehicle speed calculating module 506 may be separate processors, or be implemented as applications operating on a single processor 510.

The system 500 may be included in a vehicle.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for restricting a speed of a vehicle traveling in a curve, the method comprising:
   receiving multiple road data samples comprising location points of a curve path ahead of the vehicle;
   determining a parameter value for each of a first set of vehicle speed affecting parameters associated with the road data samples;
   determining a driver style for a driver of the vehicle based on historical driving data during a most recent driving session or sessions for the driver under known driving conditions;
   selecting a unique vehicle speed model from a plurality of predetermined vehicle speed models based on a classification of a combination of a first set of vehicle speed affecting parameter values and the determined driver style, wherein the vehicle speed models are constructed based on machine learning algorithms trained with historical driving data for a plurality of driving conditions comprising a second set of vehicle speed affecting parameters including at least one parameter that is not included in the first set of vehicle speed affecting parameters, wherein the vehicle speed models each comprise a neural network;
   determining a parameter value for each of the second set of vehicle speed affecting parameters, at least one of the parameter values of the second set of vehicle speed affecting parameters is associated with at least one of the road data samples ahead of the vehicle;
   calculating a recommended speed for the vehicle for at least one of the road data samples based on the selected unique vehicle speed model and the parameter values of the second set of vehicle speed affecting parameters; and
   providing an instruction for adapting the vehicle speed to the recommended speed at a location point of the at least one of the road data samples.

2. The method according to claim 1, wherein the driver style is based on a relation between a legal speed limit at the road sample and an historical average speed for the driver on roads with the same legal speed limit.

3. The method according to claim 1, wherein the driver style is based on the driver's tolerance for lateral acceleration during the most recent driving session or sessions.

4. The method according to claim 1, wherein the driver style is based on the driver's tolerance for longitudinal acceleration during the most recent driving session or sessions.

5. The method according to claim 1, wherein the first set of vehicle speed affecting parameters and the second set of vehicle speed affecting parameters are distinct from each other.

6. The method according to claim 1, wherein the vehicle speed models comprise a legal speed limit parameter, a curvature parameter indicative of the curvature of the path ahead of the vehicle, for at least one of the road samples.

7. The method according to claim 6, wherein the vehicle speed models comprise a road inclination parameter indicative of the road inclination for at least one of the road samples.

8. The method according to claim 1, comprising:
   adjusting the recommended speed according to a criterion before providing the instruction.

9. The method according to claim 8, wherein the criterion is at least one of a threshold speed, a threshold lateral acceleration, or a threshold longitudinal threshold.

10. The method according to claim 9, wherein the at least one of the threshold speed, the threshold lateral acceleration, or the threshold longitudinal threshold is utilized by the selected vehicle speed model.

11. A speed adaption system for restricting a speed of a vehicle traveling in a curve, the system comprising:
    a control unit module configured to:
      receive multiple road data samples comprising location points of a curve path ahead of the vehicle,
      determine a parameter value for each of a first set of vehicle speed affecting parameters, and
      determine a parameter value for each of a second set of vehicle speed affecting parameters, at least a sub-set of each set of parameter values are associated with at least one of the road data samples,
    a vehicle speed calculation module utilizing a machine learning algorithm trained with historical driving data for a plurality of driving conditions comprising the second set of vehicle speed affecting parameters including at least one parameter that is not included in the first set of vehicle speed affecting parameters configured to:
      select a unique vehicle speed model from a plurality of predetermined vehicle speed models based on a classification of a combination of a first set of vehicle speed affecting parameter values and a driver style for a driver of the vehicle determined based on historical driving data during a most recent driving session or sessions for the driver under known driving conditions,
      calculate a recommended speed for the vehicle at one of the road samples based on the selected unique vehicle speed model and the parameter values of the second set of vehicle speed affecting parameters, and provide an instruction signal indicative of the recommended speed at the one road sample, and a vehicle control unit configured to control the speed of the vehicle according to the instruction signal.

* * * * *